United States Patent
Cheng et al.

(10) Patent No.: US 12,540,678 B2
(45) Date of Patent: Feb. 3, 2026

(54) VALVE DEVICE WITH FLOATING VALVE CORE

(71) Applicant: Illinois Tool Works Inc., Glenview, IL (US)

(72) Inventors: Jing Cheng, Shanghai (CN); Li Liu, Shanghai (CN); Wei Xia, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 8 days.

(21) Appl. No.: 18/668,936

(22) Filed: May 20, 2024

(65) Prior Publication Data
US 2024/0392884 A1    Nov. 28, 2024

(30) Foreign Application Priority Data

May 24, 2023   (CN) .......................... 202310595604.4
Apr. 30, 2024  (CN) .......................... 202410543882.X

(51) Int. Cl.
*F16K 11/087*   (2006.01)
*F16K 5/20*     (2006.01)

(52) U.S. Cl.
CPC .......... *F16K 11/0873* (2013.01); *F16K 5/204* (2013.01); *F16K 5/205* (2013.01)

(58) Field of Classification Search
CPC ...... F16K 11/0873; F16K 5/204; F16K 5/201; F16K 5/205; F01P 2007/146
See application file for complete search history.

(56) References Cited

U.S. PATENT DOCUMENTS 3,033,513 A * 5/1962 Vulliez ................... F16K 5/162
                                                    74/89
3,124,333 A * 3/1964 Sivyer ..................... F16K 5/204
                                                   251/163
(Continued)

FOREIGN PATENT DOCUMENTS

CN   113217669 A * 8/2021 ........... F16K 27/067
CN   114439975 A * 5/2022 ........... F16K 31/055
(Continued)

*Primary Examiner* — David Colon-Morales
(74) *Attorney, Agent, or Firm* — McAndrews, Held & Malloy, Ltd.

(57) ABSTRACT

The present disclosure provides a valve device having a housing and a valve core. The housing internally is provided with at least two fluid passages and sealing members located at a port of each fluid passage. The valve core is disposed in the housing and comprises at least one closing wall. The valve core is configured to be capable of rotating around an axis in a first direction in the housing to enable the closing wall to align with the corresponding fluid passage to close the aligned fluid passage. The valve core is configured to be capable of making a linear motion in a second direction in the housing to allow the closing wall to tightly abut against the sealing member at the closed fluid passage. The second direction forms an angle with an imaginary bisecting plane of the closing wall of the valve core, the angle is an acute angle. When the closing wall is aligned with the fluid passage, the imaginary bisecting plane of the closing wall is parallel to the extending direction of the part of the fluid passage near a center of the housing. In the valve device of the present disclosure, the valve core can smoothly rotate between valve core positions.

18 Claims, 11 Drawing Sheets

(56) References Cited

U.S. PATENT DOCUMENTS

| | | | | |
|---|---|---|---|---|
| 3,370,612 | A * | 2/1968 | Holl | F16K 11/0873 251/315.08 |
| 3,473,554 | A * | 10/1969 | King | F16K 5/204 251/315.08 |
| 3,533,597 | A * | 10/1970 | Bolling | F16K 11/0873 251/174 |
| 3,941,351 | A * | 3/1976 | Graham | F16K 5/0647 251/163 |
| 4,066,240 | A * | 1/1978 | Atkinson | F16K 5/208 251/185 |
| 4,174,090 | A * | 11/1979 | Nelimarkka | F16K 5/204 251/315.08 |
| 4,174,825 | A * | 11/1979 | Nelimarkka | F16K 5/204 251/315.08 |
| 4,232,709 | A * | 11/1980 | Zoric | F16K 11/0873 251/175 |
| 4,296,913 | A * | 10/1981 | Hoyer | F16K 5/204 251/76 |
| 4,917,354 | A * | 4/1990 | Chambers | F16K 5/204 251/163 |
| 4,940,210 | A * | 7/1990 | Gilmore | F16K 5/204 251/188 |
| 5,265,845 | A * | 11/1993 | Gilliam | F16K 5/204 251/192 |
| 5,308,039 | A * | 5/1994 | King | F16K 5/204 251/188 |
| 6,082,707 | A * | 7/2000 | Hosie | F16K 5/205 251/181 |
| 6,173,940 | B1 * | 1/2001 | Kardohely | F16K 27/067 251/315.16 |
| 7,350,765 | B2 * | 4/2008 | Leblanc | F16K 5/204 251/286 |
| 7,559,531 | B2 * | 7/2009 | Thomas | F16K 5/0642 251/185 |
| 7,712,724 | B2 * | 5/2010 | Thomas | F16K 5/201 137/625.46 |
| 8,398,053 | B2 * | 3/2013 | Ezekiel | F16K 5/204 251/315.08 |
| 8,403,293 | B2 * | 3/2013 | Cowie | F16K 5/204 251/192 |
| 8,820,706 | B2 * | 9/2014 | Kawauchi | F16K 5/205 251/315.01 |
| 9,951,878 | B2 * | 4/2018 | Heldberg | F16K 5/08 |
| 10,125,878 | B2 * | 11/2018 | Bartonek | F16K 11/166 |
| 10,197,168 | B1 * | 2/2019 | Whitlow | F16K 5/0689 |
| 10,295,066 | B2 * | 5/2019 | Kaczmar | F16K 31/041 |
| 10,352,460 | B2 * | 7/2019 | Jang | F16K 5/0678 |
| 10,591,069 | B2 * | 3/2020 | Russalian | F16K 5/0605 |
| 10,626,784 | B2 * | 4/2020 | Akase | F16K 25/005 |
| 10,648,577 | B2 * | 5/2020 | Ozeki | F16K 11/0712 |
| 10,865,888 | B2 * | 12/2020 | Grosskopf | F16K 5/201 |
| 11,009,136 | B2 * | 5/2021 | Berkovitz | F16K 5/201 |
| 11,047,492 | B2 * | 6/2021 | Kawamoto | F16K 31/055 |
| 11,181,201 | B2 * | 11/2021 | Ray | F16K 5/205 |
| 11,274,751 | B2 * | 3/2022 | Roppolo | F16K 5/0689 |
| 11,319,864 | B2 * | 5/2022 | Xi | F01P 5/10 |
| 11,441,690 | B2 * | 9/2022 | Maruyama | F16K 11/076 |
| 11,454,327 | B2 * | 9/2022 | Boyd | E21B 34/00 |
| 11,703,136 | B2 * | 7/2023 | Mimura | F16K 5/205 251/172 |
| 11,971,116 | B2 * | 4/2024 | Tochigi | F01P 7/14 |
| 2006/0118066 | A1 * | 6/2006 | Martins | F16K 11/0856 123/41.08 |
| 2021/0215258 | A1 * | 7/2021 | Ma | F01P 7/16 |
| 2021/0332893 | A1 * | 10/2021 | Ma | F16K 5/0442 |
| 2023/0304597 | A1 * | 9/2023 | Fleischmann | F16K 31/042 |

FOREIGN PATENT DOCUMENTS

| | | | | |
|---|---|---|---|---|
| DE | 3941153 | A * | 4/1991 | |
| DE | 10052327 | A1 * | 4/2002 | F16K 11/0873 |
| DE | 102016005335 | A1 * | 11/2017 | F16K 11/0873 |
| EP | 4098914 | A1 * | 12/2022 | F16K 31/52466 |
| FR | 1490328 | A * | 7/1967 | F16K 5/205 |
| KR | 20220150557 | A * | 11/2022 | B60K 11/02 |

* cited by examiner

VALVE DEVICE WITH FLOATING VALVE CORE

RELATED APPLICATIONS

The present application claims the benefit of Chinese Patent Application Nos. 202310595604.4, filed May 24, 2023, and 202410543882.X, filed Apr. 30, 2024, each titled "Valve Device with Floating Valve Core," the contents of which are hereby incorporated by reference.

TECHNICAL FIELD

The present disclosure relates to a valve device, and in particular to a valve device with a floating valve core.

BACKGROUND

During thermal management of a vehicle, a valve device can connect or disconnect a fluid flow path to provide a circulating flow path for heating an engine and/or a battery of the vehicle and to provide a circulating flow path for cooling the engine and/or the battery, so as to allow vehicle components to operate at a desired temperature.

SUMMARY

The present disclosure relates generally to a valve device, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
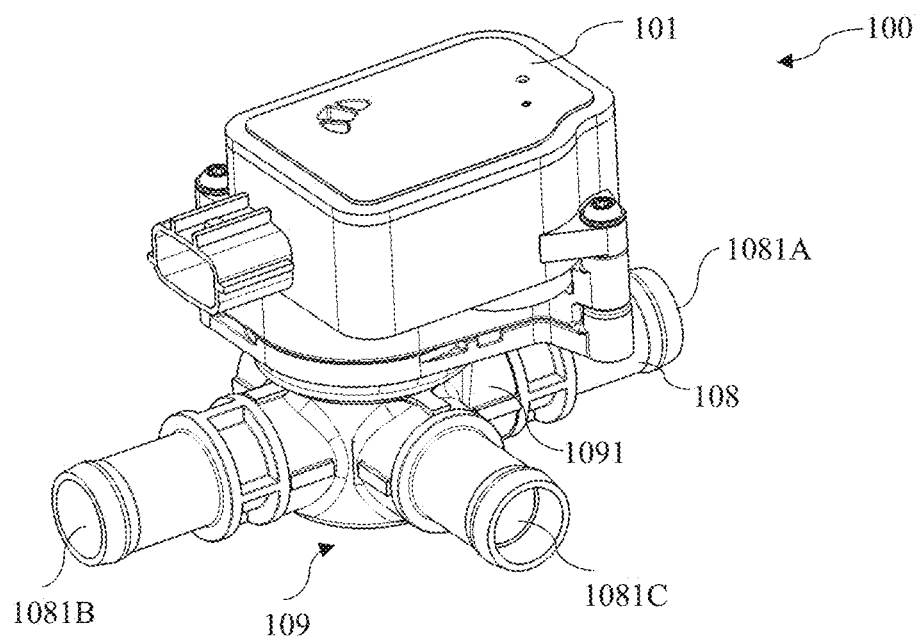
FIG. 1A is a perspective view of a valve device according to a first example of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

A valve device includes a housing and a valve core. Several fluid passages are provided in the housing, and the valve core includes at least one closing wall. The valve core can rotate to align the closing wall with the corresponding fluid passage, so that the aligned fluid passage is closed to prevent the fluid from flowing therethrough. In addition, when the closing wall of the valve core aligns with the corresponding fluid passage, the closing wall also tightly abuts against a sealing member at a port of the fluid passage, to enable the closing wall to engage with the aligned fluid passage in a sealing manner. The fluid passage not aligning with the closing wall is opened to allow the fluid flowing therethrough.

An extant problem is that the valve core cannot rotate smoothly to a desired position during operation of the valve device. It has also has been found with observation that, when the closing wall tightly abuts against the sealing member at the port of the aligned fluid passage, the closing wall moves towards the fluid passage. When the closing wall moves too far towards the fluid passage, the sealing member at the port of the fluid passage adjacent to the aligned fluid passage will prevent the closing wall from rotating. This is because an edge of the closing wall may detach from the sealing member at the port of the adjacent fluid passage or engage with an edge of the sealing member, so that the sealing member at the port of the adjacent fluid passage will deform due to not suffering pressing or suffering less pressing, in turn stop the closing wall in a rotating path of the valve core (or closing wall), thus causing the valve core not to smoothly rotate.

In order to solve the problem mentioned above, the present disclosure provides a valve device including a housing and a valve core. When the closing wall tightly abuts against the sealing member at the port of the aligned fluid passage, the closing wall would not move more distance towards the fluid passage, so as to ensure that the valve core can smoothly rotate.

Specifically, according to one aspect of the present disclosure, the present disclosure provides a valve device including a housing and a valve core. The housing is internally provided with at least two fluid passages and sealing members located at a port of each fluid passages. The valve core is disposed in the housing and includes at least one closing wall. The valve core is configured to be capable of rotating around an axis in a first direction X in the housing to enable the closing wall to align with the corresponding fluid passage to close the aligned fluid passage. The valve core is configured to be capable of making a linear motion in a second direction Y in the housing to allow the closing wall to tightly abut against the sealing member at the closed fluid passage. The second direction Y forms an angle with an imaginary bisecting plane of the closing wall of the valve core, the angle is an acute angle.

According to one aspect of the present disclosure, the valve core further comprises an engagement portion. The engagement portion is configured to be capable of engaging with a driving member, to allow the valve core to be driven by the driving member to rotate around the axis in the first direction, and to allow the valve core to be driven by a fluid pressure to make a linear motion in the second direction Y relative to the driving member.

According to one aspect of the present disclosure, the engagement portion of the valve core comprises one of a guide groove and a protrusion, the guide groove and the protrusion extend in the second direction Y.

According to one aspect of the present disclosure, the valve device further comprises the driving member comprising a driving portion. The driving portion is shaped to match the engagement portion of the valve core so as to enable the valve core to engage with the driving member.

According to one aspect of the present disclosure, the driving portion of the driving member comprises the other one of the guide groove and the protrusion, the guide groove is configured to receive the protrusion. The guide groove is adapted to the protrusion in a widthwise direction, so as to enable the protrusion to drive the guide groove to rotate around the axis in the first direction X, or enable the guide groove to drive the protrusion to rotate around the axis in the first direction X. The length of the guide groove in a lengthwise direction is greater than the length of the protrusion, such that the protrusion does not prevent the guide groove from being driven by the fluid pressure to make a linear motion in the second direction Y, or such that the guide groove does not prevent the protrusion from being driven by the fluid pressure to make a linear motion in the second direction Y.

According to one aspect of the present disclosure, the angle is 0 to 60 degrees, and preferably 0 to 45 degrees.

According to one aspect of the present disclosure, the angle is 30 to 45 degrees, or 45 to 60 degrees.

According to one aspect of the present disclosure, the valve device comprises a four-way valve device comprising four fluid passages. The valve core of the four-way valve device comprises two adjacently arranged closing walls.

According to one aspect of the present disclosure, the imaginary bisecting plane of the closing wall of the valve core is parallel to the axis of the valve core and passes through a center of the closing wall and a center of the valve core. The valve core is hollow and comprises at least one opening. The valve core is configured to be capable of rotating around the axis in the first direction X in the housing to enable the opening to align with the corresponding fluid passage to open the aligned fluid passage. The second direction Y is perpendicular to the first direction X.

According to one aspect of the present disclosure, the housing comprises at least two fluid connection portions and is provided with at least two fluid connectors in fluid communication with the at least two fluid connection portions. The at least two fluid connection portions and the at least two fluid connectors define the at least two fluid passages. The sealing member provided in each of the fluid connection portions is spaced apart from the corresponding fluid connector by a gap S.

Figure 1B:
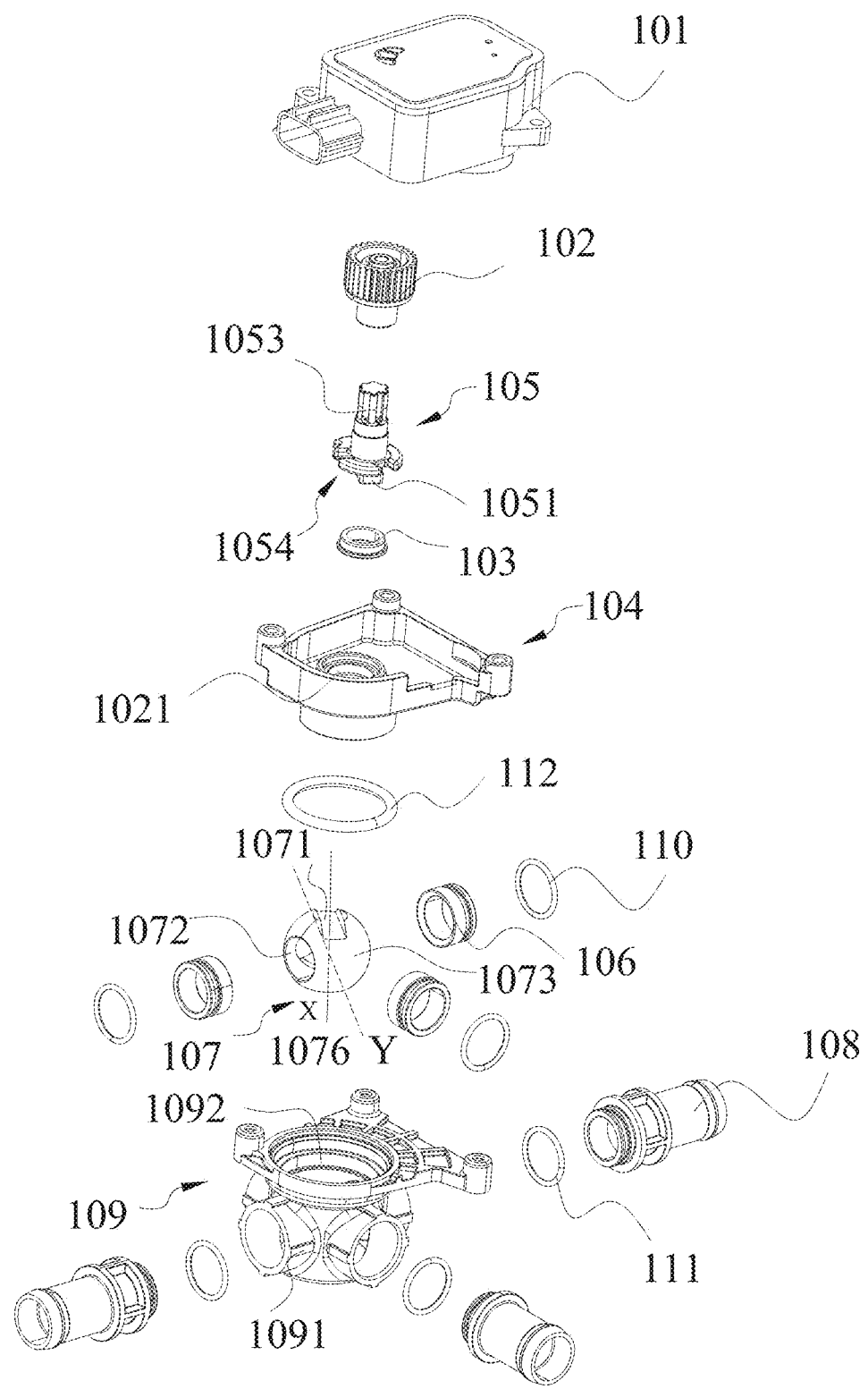
FIG. 1B is an exploded view of the valve device shown in FIG. 1A.

FIG. 1A is a perspective view of a valve device 100 according to a first example of the present disclosure and FIG. 1B is an exploded view of the valve device 100 shown in FIG. 1A, to clearly illustrate the components of the valve device 100 and the relationship between the components.

As shown in FIG. 1A, the valve device 100 includes a power source 101 and a housing 109. A valve core 107 is disposed in the housing 109 (see FIG. 1B). The housing 109 includes three hollow fluid connection portions 1091 and three fluid connectors 108 which connect to the three fluid connection portions 1091, respectively. The three fluid connection portions 1091 and three fluid connectors 108 define three fluid passages 1081A, 1081B, 1081C. The fluid passages 1081A, 1081B, 1081C can be collectively called fluid passages 1081. The valve device 100 can be called a three-way valve device. In other examples, the valve device 100 includes other appropriate number of fluid passages.

As shown in FIG. 1B, the valve device 100 further includes a bearing 102, a shaft seal 103, a valve cover 104, a driving member 105 and sealing members 106. The sealing members 106 are disposed at ports of the fluid passages 1081A, 1081B, 1081C of the housing 109 near a center of the housing 109, such as, a part of the fluid connection portions 1091 near the center of the housing 109. The sealing member 106 is ring-shaped, for example, is a PTFE ring. Each sealing member 106 is connected to the corresponding fluid connection portion 1091 of the housing 109 near the center of the housing 109 in a sealing manner by means of a first sealing ring 110. Each fluid connector 108 is connected to the corresponding fluid connection portion 1091 of the housing 109 away from the center of the housing 109 in a sealing manner by means of a second sealing ring 111. Each sealing member 106 is spaced apart from the corresponding fluid connector 108 by a gap S (see FIG. 3B).

The valve core 107 is disposed in the housing 109. The valve core 107 can rotate in the housing 109 to open and close the corresponding fluid passages 1081A, 1081B, 1081C in the housing 109, thereby achieving flowing of the fluid between the fluid passages 1081A, 1081B, 1081C. The valve core 107 is hollow and includes three openings 1072 and one closing wall 1073. The valve core 107 is configured to be capable of rotating around an axis 1076 in a first direction X in the housing 109 to enable the closing wall 1073 to align with one fluid passage 1081A, 1081B or 1081C to close the aligned fluid passage, and to enable the openings 1072 to align with other fluid passages in the housing 109 to open the aligned fluid passage. When closing a fluid passage, fluid is prevented from flowing from the fluid passage into the valve core 107 or flowing from the valve core 107 into the fluid passage. When opening a fluid passage, fluid can flow from the fluid passage into the valve core 107 or flow from the valve core 107 into the fluid passage. The valve core 107 is also configured to be capable of making a linear motion in a second direction Y in the housing 109 to allow the closing wall 1073 to tightly abut against the sealing member 106 (such as, disposed in the fluid connection portion 1091) at a port of the closed fluid passage 1081A, 1081B or 1081C. In an example, the second direction Y is perpendicular to the first direction X. The valve core 107 can make the linear motion while rotating. The valve core 107 can further make the linear motion after ending the rotating, to increase a sealing pressure that the valve core 107 applies to the sealing member 106, thereby ensuring that the valve core 107 seals the closed fluid passage. In other examples, the valve core 107 comprises other appropriate number of openings and closing walls.

The valve core 107 is driven by the driving member 105 to rotate around the axis 1076 in the first direction X, and driven by a fluid pressure to make the linear motion in the second direction Y relative to the driving member 105. The driving member 105 includes a first end portion 1053 and a second end portion 1054. The power source 101 connects to the first end portion 1053 of the driving member 105 and is configured to drive the driving member 105 to rotate. In an example, the power source 101 is an actuator which includes an electric motor. The bearing 102 is configured to support the driving member 105. The driving member 105 is configured to engage with the valve core 107, drive the valve core 107 to rotate around the axis 1076 in the first direction X, and allow the valve core 107 to be driven by the fluid pressure created by fluid flowing therein to make the linear motion in the second direction Y relative to the driving member 105. When the valve core 107 rotates to a desired valve core position, the driving member 105 stops moving, at this moment fluid flowing into the valve core 107 drives the valve core 107 to make the linear motion in the second direction Y relative to the driving member 105, to tightly abut against the sealing member 106 within the fluid connection portion 1091. The second end portion 1054 of the driving member 105 includes a driving portion 1051, and an engagement portion 1071 is disposed on, such as, the top of, the valve core 107. The driving portion 1051 is shaped to match the engagement portion 1071. In an example, the driving portion 1051 of the driving member 105 comprises one of a guide groove and a protrusion, the engagement portion 1071 of the valve core 107 comprises the other one of the guide groove and the protrusion, and the guide groove is configured to receive the protrusion. The guide groove and the protrusion extend in the second direction Y. In an example, the length direction of the guide groove and the protrusion is parallel to the second direction Y.

In an example, the valve core 107 is substantially a hollow spherical body, and the openings 1072 of the valve core 107 are the openings formed after cutting parts from the spherical body. The outer surface of the valve core 107 is substantially spherical surface. In another example, the valve core 107 is substantially a hollow cylinder, and the openings 1072 of the valve core 107 are the openings on the side wall of the cylinder. The outer surface of the valve core 107 is an outer surface of the side wall of the cylinder. The hollow valve core 107 includes inner surface in desired shape. In an example, the inner surface is formed in a way of easily machining or mould demoulding.

As described above, in the present disclosure, the valve core 107 and the driving member 105 are of a separate design, and the valve core 107 is movable relative to the driving member 105 and is of a floating design, so that the valve core 107 and the driving member 105 have low machining, manufacturing and assembly requirements. The sealing member 106 is a PTFE ring which is simple in form and low in cost. According to the present disclosure, the sealing member 106 is compressed under the action of the fluid pressure acting on an inner surface of the closing wall 1073 aligned with the fluid passage 1081 to achieve sealing, and since the fluid pressure acts only on the closing wall 1073, the torque requirement on the power source 101 is small when making the valve core 107 rotate to other valve core positions. In addition, the leakage is not sensitive to the operating life. For example, leakage does not increase as operating life increases, because the fluid pressure acting on the closing wall 1073 aligned with the fluid passage 1081 is the same before and after the operating life increases and is independent of the elasticity of the sealing member 106 and the wear of the closing wall 1073.

Figure 2A:
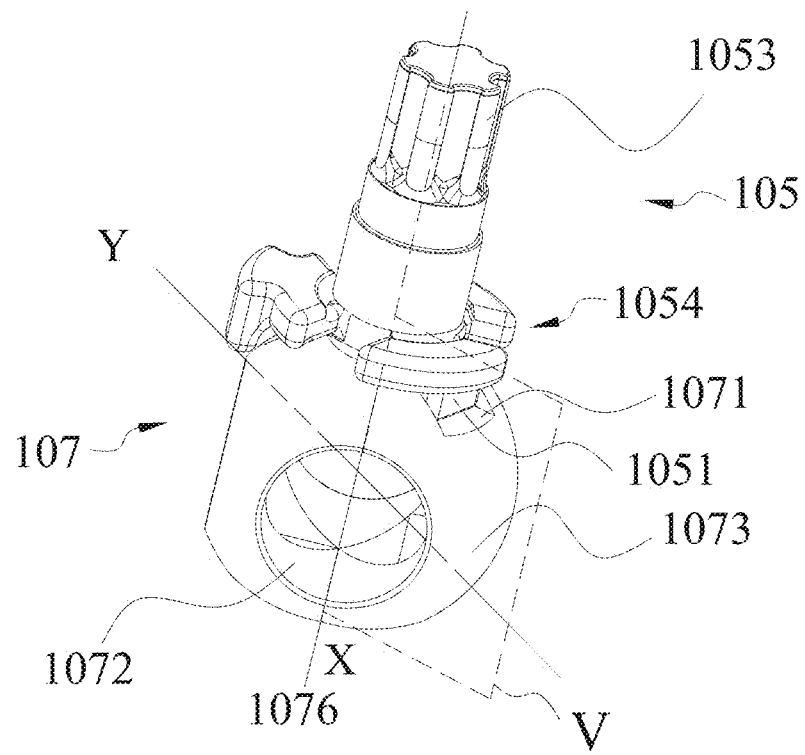
FIG. 2A is a perspective view of a portion of the valve device (including a driving member and a valve core) shown in FIG. 1A.
Figure 2B:
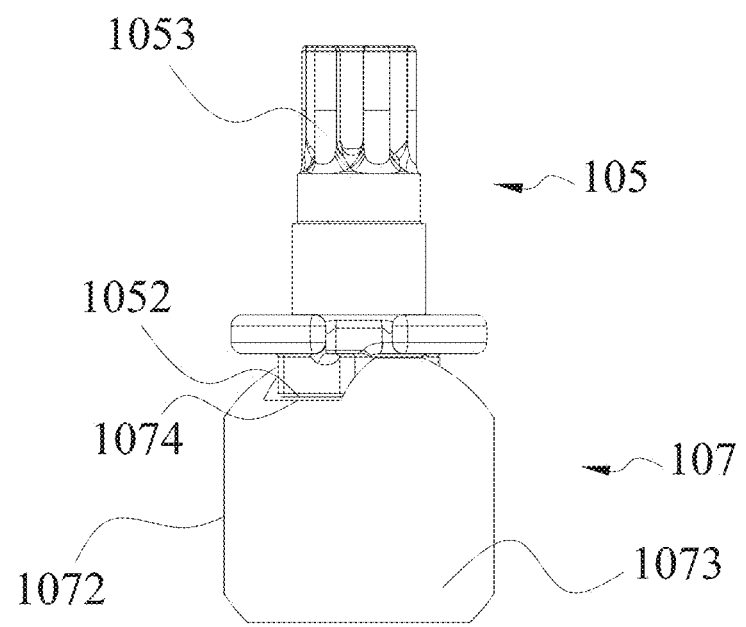
FIG. 2B is a right view of FIG. 2A.
Figure 2C:
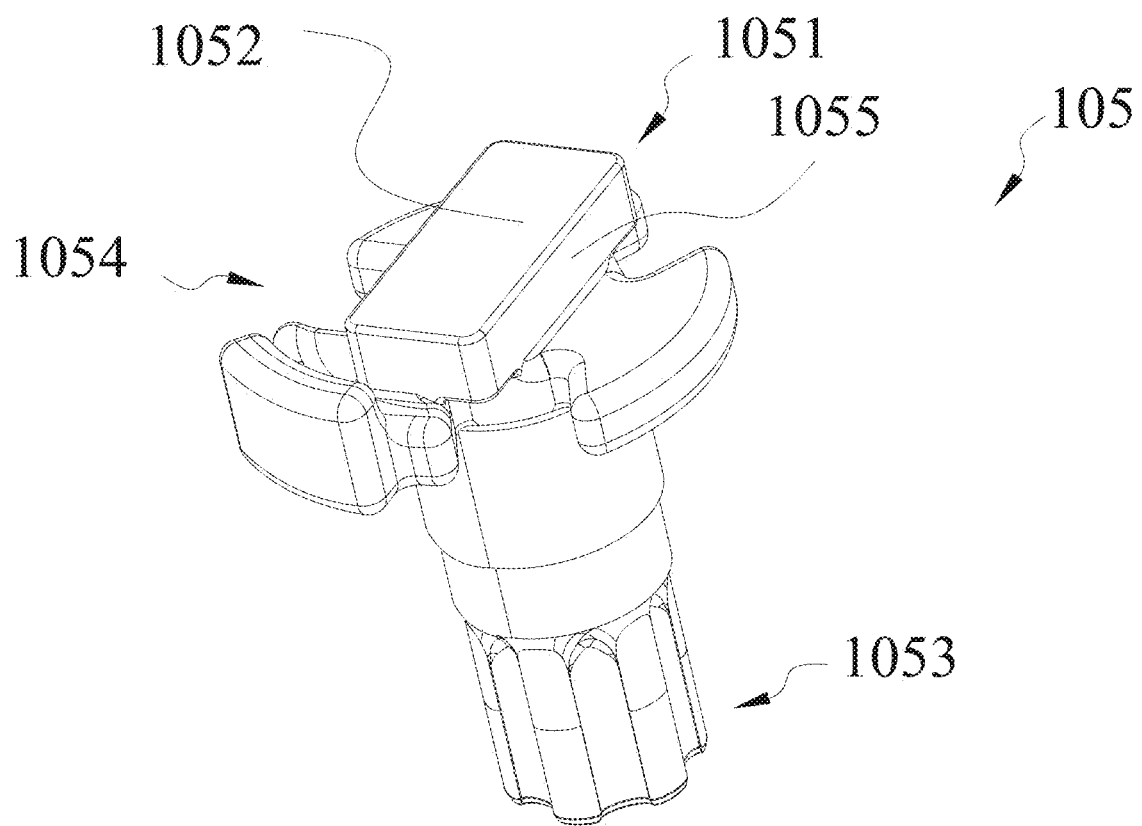
FIG. 2C is a perspective view of the driving member of the valve device shown in FIG. 1A as viewed from the bottom.
Figure 2D:
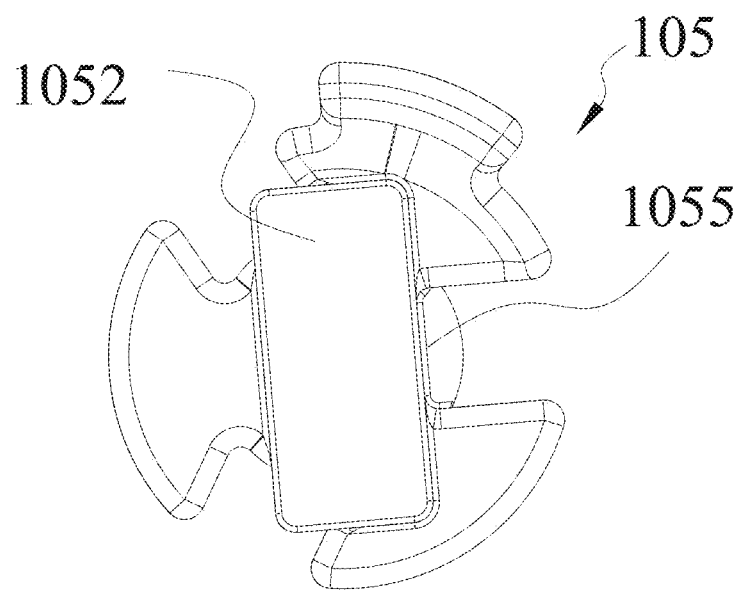
FIG. 2D is a top view of FIG. 2C.
Figure 2E:
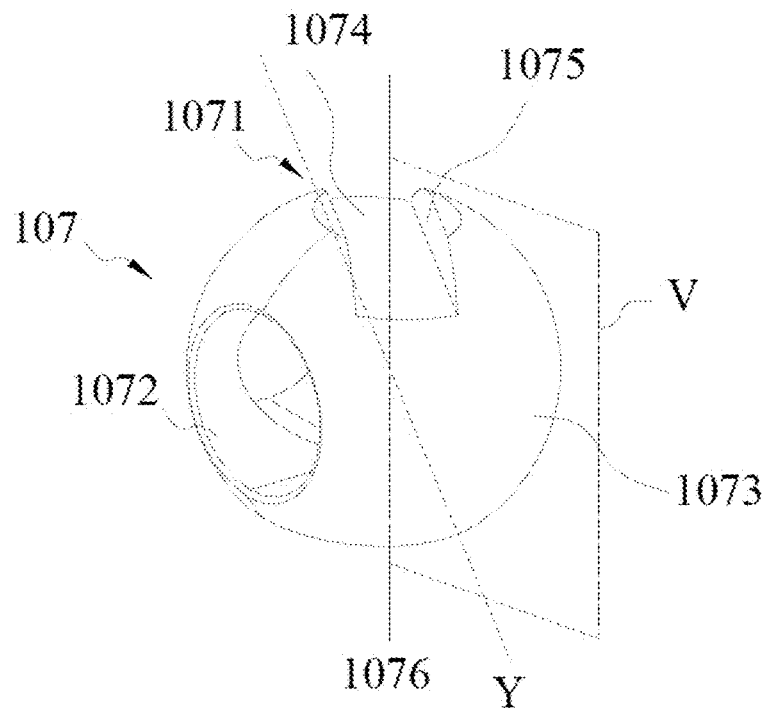
FIG. 2E is a perspective view of the valve core of the valve device shown in FIG. 1A.
Figure 2F:
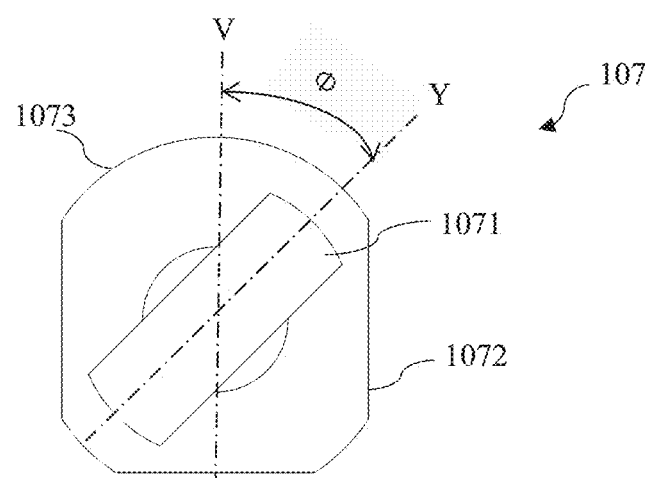
FIG. 2F is a top view of FIG. 2E.
Figure 3A:
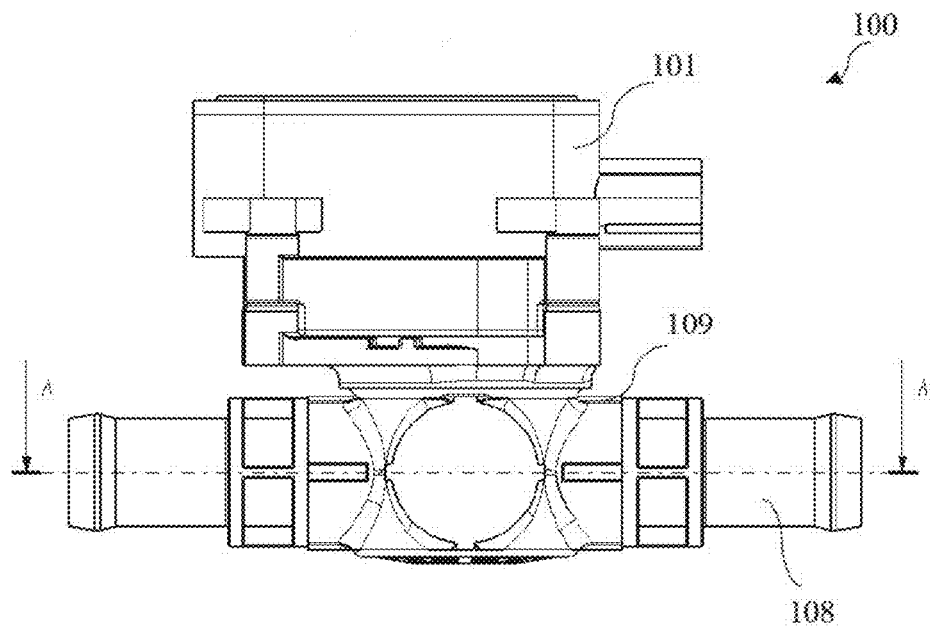
FIG. 3A is a rear view of the valve device shown in FIG. 1A.
Figure 3B:
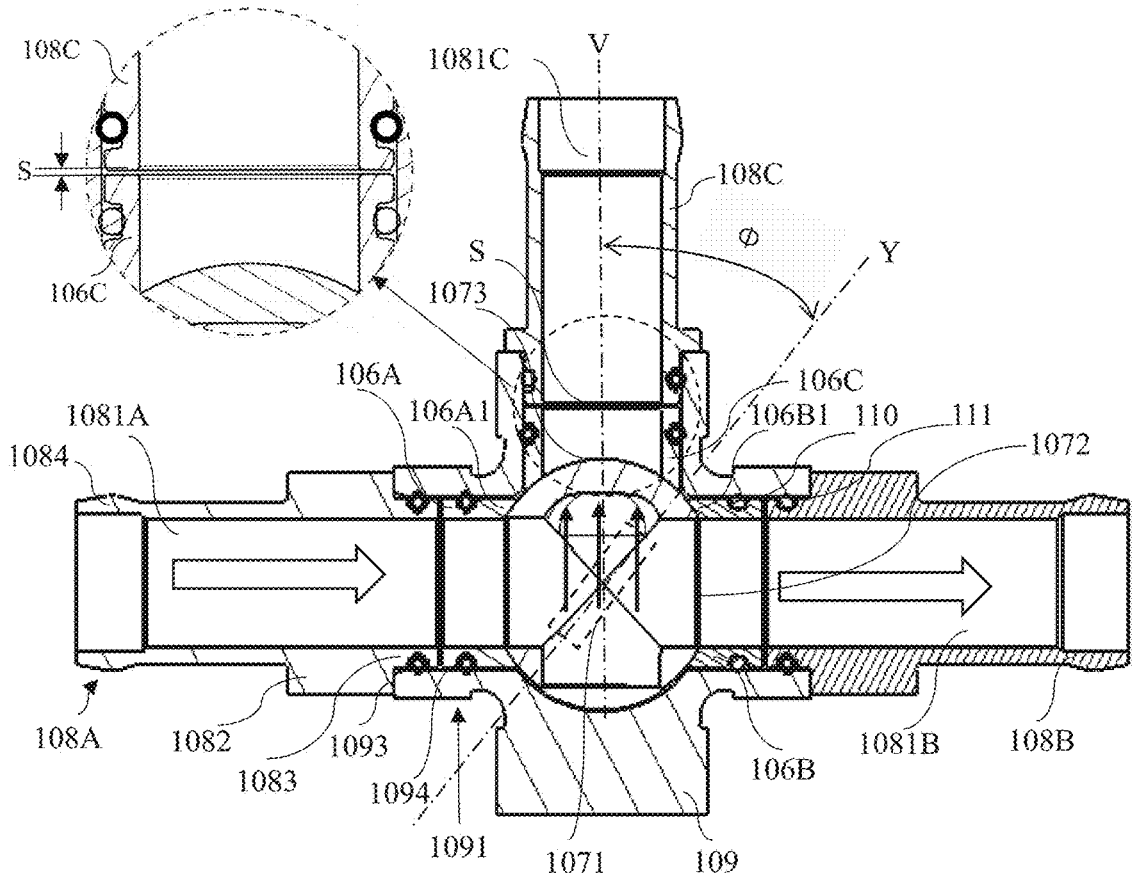
FIG. 3B is a cross-sectional view, taken along section line A-A, of the valve core of the valve device shown in FIG. 3A when in a first valve core position.
Figure 3C:
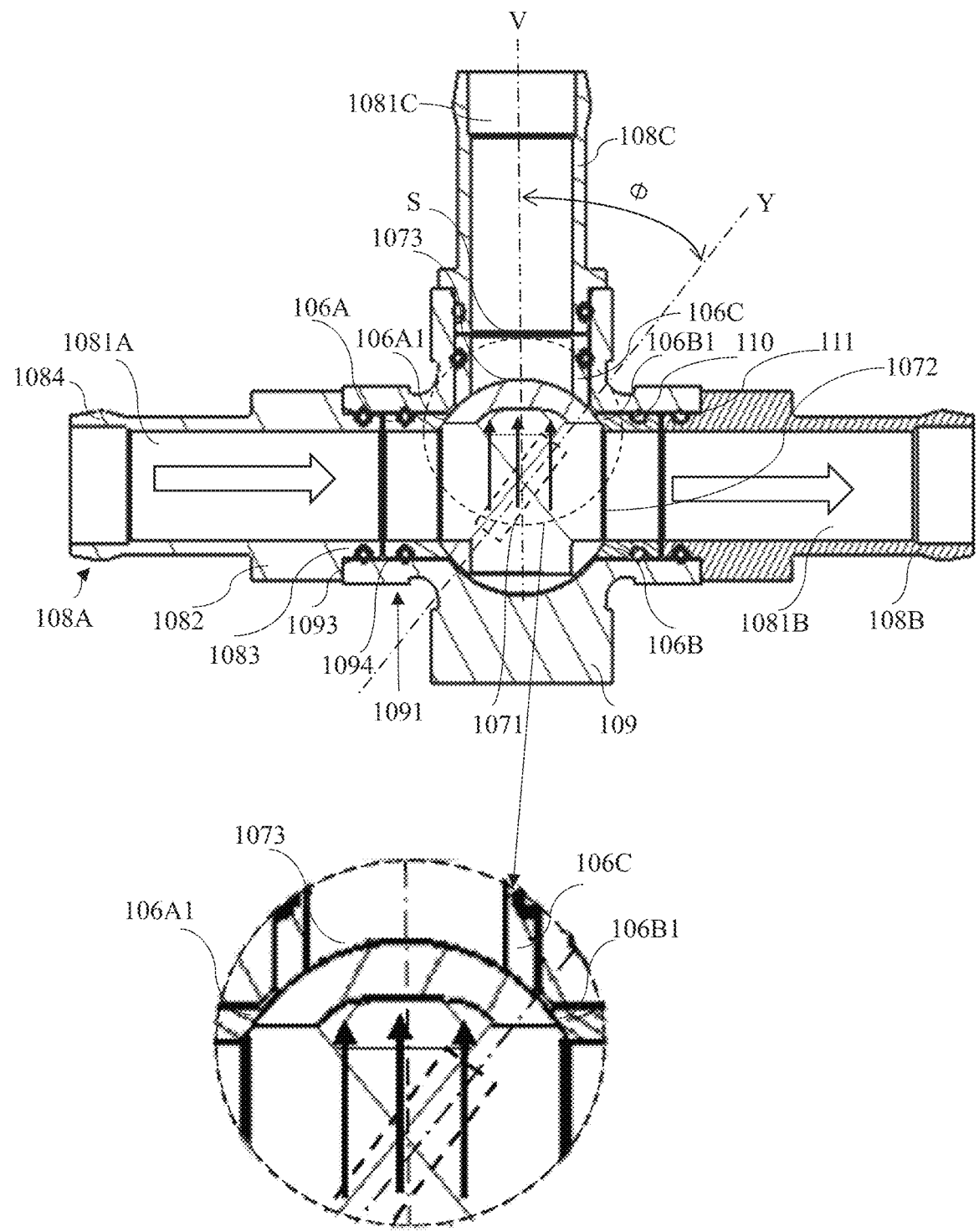
FIG. 3C is a cross-sectional view, taken along section line A-A, of a valve core of a valve device according to another example when in the first valve core position.

In addition, in the present disclosure, the second direction Y along which the engagement portion 1071 of the valve core 107 extends forms an angle Φ with an imaginary bisecting plane V of the closing wall 1073 of the valve core 107 (see FIG. 2F and FIGS. 3B-3C). The imaginary bisecting plane V of the closing wall 1073 is parallel to the axis 1076 in the first direction X of the valve core 107 and passes through a center of the closing wall 1073 and a center of the valve core 107. The angle Φ is an acute angle, such as, 0 to 45 degrees (including 60 degrees), 0 to 45 degrees (including 45 degrees), 0 to 30 degrees (including 30 degrees), 30 to 45 degrees (including 30 degrees and 45 degrees), or 45 to 60 degrees (including 45 degrees and 60 degrees). When the closing wall 1073 is aligned with the fluid passage 1081A, 1081B or 1081C, the imaginary bisecting plane V of the closing wall 1073 is parallel to the extending direction of the aligned fluid passage, such as, at least parallel to the extending direction of a part of the fluid passage near the closing wall 1073. In this example, when the valve core 107 is in a certain valve core position to allow the fluid to flow among the plurality of fluid passages 1081A, 1081B, 1081C, the pressure fluid created by the fluid flowing into the valve core 107 actuates the valve core 107 to move towards the two sealing members 106 in the second direction Y at an angle to the imaginary bisecting plane V of the sealing wall 1073, such that the closing wall 1073 can not only tightly abut against the sealing members 106 aligned therewith, but also tightly abut against the sealing members 106 adjacent thereto. Therefore, the closing wall 1073 in this state can close the fluid passages 108 aligned therewith, and also facilitate the valve core 107 to rotate smoothly to other valve core positions in subsequent operations (see FIGS. 3B to 3C).

The valve cover 104 is configured to cover an opening 1092 at an upper portion of the housing 109. The valve cover 104 is connected to the housing 109 in a sealing manner by means of a third sealing ring 112. The valve cover 104 includes an opening 1021 that is aligned with and in communication with the opening 1092 at the upper portion of the housing 109. The driving member 105 can pass through the opening 1092 of the valve cover 104 and the opening 1021 of the housing 109 and then extend into the housing 109 to engage with the valve core 107 in the housing 109, such as, the driving portion 1051 of the driving member 105 engages with the engagement portion 1071 of the valve core 107. The shaft seal 103 is disposed between the driving member 105 and the opening 1092 of the valve cover 104 so than the driving member 105 and the valve cover 104 can engage with each other in a sealing manner. In other examples, the valve device 100 includes other suitable structure.

In other examples, the valve device 100 manually drives the valve core 107 to rotate, and the valve device 100 does not include the power source 101. In an example, an operator uses a tool to actuate the driving member 105 to rotate and thus drive the valve core 107 to rotate to the valve core positions to achieve connection and disconnection of the multiple fluid passages.

FIG. 2A is a perspective view of a portion of the valve device 100 (including a driving member 105 and a valve core 107) shown in FIG. 1A, FIG. 2B is a right view of FIG. 2A, FIG. 2C is a perspective view of the driving member 105 of the valve device 100 shown in FIG. 1A as viewed from the bottom, FIG. 2D is a top view of FIG. 2C, FIG. 2E is a perspective view of the valve core 107 of the valve device 100 shown in FIG. 1A, and FIG. 2F is a top view of FIG. 2E, so as to illustrate the specific structures of the driving member 105 and the valve core 107 and the cooperative relationship therebetween.

As shown in FIGS. 2A and 2B, the driving portion 1051 at the bottom (the second end portion 1054) of the driving member 105 engages with the engagement portion 1071 at the top of the valve core 107, such that the rotation of the driving member 105 can drive the valve core 107 to rotate around the rotating axis 1076 thereof in the first direction X, and the valve core 107 can move in the second direction Y relative to the driving member 105. As shown in FIGS. 2C and 2D, the second end portion 1054 of the driving member 105 is provided with the driving portion 1051 that is a protrusion in shape of cuboid. The driving portion 1051 includes a surface 1052 (the bottom surface) and two opposite long side surfaces 1055. As shown in FIGS. 2E and 2F, the engagement portion 1071 of the valve core 107 is located at the top of the valve core 107. The engagement portion 1071 is a strip-shaped guide groove, such as, a recess, that is shaped to match the driving portion 1051 for receiving the cuboid-shaped driving portion 1051. The guide groove includes the bottom surface 1074 and two opposite side surfaces 1075. The valve core 107 includes three openings 1072 and one closing wall 1073. The three openings 1072 are sized substantially the same, and two of them are disposed opposite to each other, the remaining one is disposed opposite to the closing wall 1073. The valve core 107 is substantially a spherical body. The outer surface of the closing wall 1073 is a part of the spherical surface of the spherical body. In an example, the openings 1072 are through holes formed on the side walls by cutting parts from the spherical body, and the engagement portion 1071 is a recess formed by cutting a part from the spherical body. The guide groove and the protrusion extend in the second direction Y, which forms an angle Φ with the imaginary bisecting plane V of the closing wall 1073. The angle Φ shown in this example is 45 degrees.

The protrusion of the driving member 105 is adapted to the guide groove of the valve core 107 in a widthwise direction, so as to enable the protrusion to drive the guide groove to rotate around the axis 1076 in the first direction X, i.e., driving the valve core 107 to rotate around the axis 1076 in the first direction X. The length of the guide groove of the valve core 107 in a lengthwise direction is greater than the length of the protrusion of the driving member 105, such that the protrusion of the driving member 105 does not prevent the guide groove of the valve core 107 from being driven by the fluid pressure to make a linear motion in the second direction Y.

In other examples, the driving portion 1051 of the driving member 105 is a guide groove, the engagement portion 1071 of the valve core 107 is a protrusion. The guide groove and the protrusion have substantially the same structure and perform substantially the same function as the above-described guide groove and protrusion. For example, the guide groove of the driving member 105 is adapted to the protrusion of the valve core 107 in a widthwise direction, so as to enable the guide groove to drive the protrusion to rotate around the axis 1076 in the first direction X, i.e., driving the valve core 107 to rotate around the axis 1076 in the first direction X. The length of the guide groove of the driving member 105 in a lengthwise direction is greater than the length of the protrusion of the valve core 107, such that the guide groove of the driving member 105 does not prevent the protrusion of the valve core 107 from being driven by the fluid pressure to make a linear motion in the second direction Y.

Figure 3D:
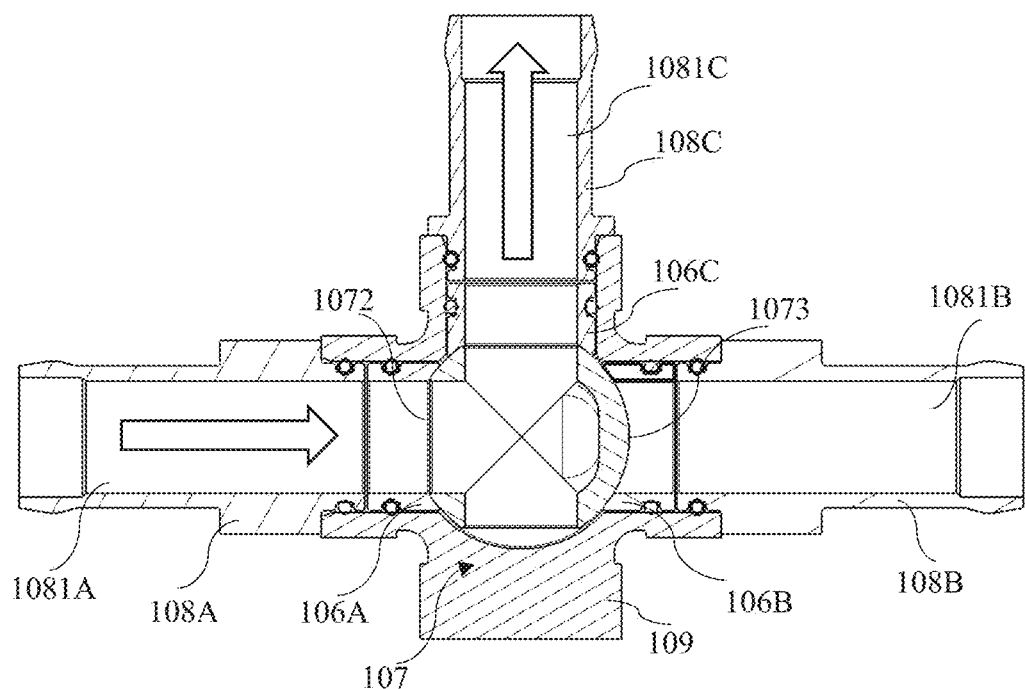
FIG. 3D is a cross-sectional view, taken along section line A-A, of the valve core of the valve device shown in FIG. 3A when in a second valve core position.

FIG. 3A is a rear view of the valve device 100 shown in FIG. 1A, FIG. 3B is a cross-sectional view, taken along section line A-A, of the valve core 107 of the valve device 100 shown in FIG. 3A when in a first valve core position, FIG. 3C is a cross-sectional view, taken along section line A-A, of a valve core 107 of a valve device 100 according to another example when in the first valve core position, and FIG. 3D is a cross-sectional view, taken along section line A-A, of the valve core 107 of a valve device 100 shown in FIG. 3A when in a second valve core position.

As shown in FIG. 3B, the valve device 100 includes three fluid connectors 108A, 108B, 108C which are respectively axially aligned with and longitudinally spaced apart from three scaling members 106A, 106B, 106C by a gap S (see the enlarged view shown in the dashed circle). The sealing members 106A, 106B, 106C can be collectively called sealing members 106. The fluid connectors 108A, 108B, 108C are arranged in a T-shape. In this example, the fluid connectors 108A, 108B are in a straight line, and the fluid connector 108C is perpendicular to the fluid connectors 108A, 108B. The fluid connectors 108A, 108B, 108C and the sealing members 106A, 106B, 106C internally form the fluid passages 1081A, 1081B, 1081C, respectively. Each fluid connector 108A, 108B, 108C includes a flange 1082, a proximal end portion 1083, and a distal end portion 1084. Each connection portion 1091 of the housing 109 includes an end 1093 and an inner side 1094. The flange 1082 of the fluid connector 108A, 108B, 108C is fixedly connected, for example, by welding, to the end 1093 of the connection portion 1091 of the housing 109. The proximal end portion 1083 of the fluid connector 108A, 108B, 108C is connected to the inner side 1094 of the housing 109 in a sealing manner by means of a second sealing ring 111. The sealing member 106 is connected to the inner side 1094 of the housing 109 in a sealing manner by means of a first sealing ring 110. The distal end portions 1084 of the fluid connectors 108A, 108B, 108C are configured to be connected to fluid pipe fittings in an application environment to allow the valve device 100 to be applicable in the application environment to achieve flowing of the fluid. The application environment includes a vehicle thermal management system, etc.

As shown in FIG. 3B, the valve core 107 rotates to the first valve core position to allow the valve device 100 to be in a first flow state. In the first valve core position, the two openings 1072 of the valve core 107 are respectively aligned with the fluid passages 1081A, 1081B, and the closing wall 1073 of the valve core 107 is aligned with the fluid passage 1081C. When the valve device 100 is in the first flow state, the fluid can flow in from the fluid passage 1081A, sequentially flow through the opening 1072 aligned with the fluid passage 1081A, the inside of the valve core 107, and the opening 1072 aligned with the fluid passage 1081B, and flow out from the fluid passage 1081B (as indicated by the arrows). The sealing member 106C tightly abuts against the closing wall 1073 to engage with the closing wall 1073 in a sealing manner, thereby preventing the fluid from flowing into the fluid passage 1081C.

The engagement portion 1071 (such as, guide groove) of the valve core 107 extends in the second direction Y. The valve core 107 can make the linear motion in the second direction Y. The second direction Y forms an angle Φ with the imaginary bisecting plane V of the closing wall 1073 of the valve core 107. The angle Φ is an acute angle. The angle Φ shown in this example is 45 degrees. In this example, when the fluid flows into the valve core 107, under the action of the pressure generated by the flowing fluid, the valve core 107 moves towards both the fluid connectors 108B, 108C in the second direction Y, such that the closing wall 1073 of the valve core 107 not only tightly abuts against the sealing member 106C, but also tightly abuts against the sealing members 106A, 106B adjacent thereto, that is, respectively abuts against the ports 106A1, 106B1 of the sealing members 106A, 106B. The closing wall 1073 of the valve core 107 is in contact with the sealing members 106A, 106B, 106C, such that the valve core 107 can rotate smoothly to other valve core positions when needed.

When the second direction Y along which the engagement portion 1071 of the valve core 107 extends is parallel to the imaginary bisecting plane V of the closing wall 1073 of the valve core 107, the valve core 107 moves, under the action of the fluid pressure, towards one fluid connector 108C in the second direction Y parallel to the imaginary bisecting plane V of the closing wall 1073. Therefore, it is easy to cause the closing wall 1073 to move too far towards the fluid connector 108C and thus detach from the sealing members 106A, 106B adjacent thereto or come into contact with the edges of the sealing members 106A, 106B adjacent thereto, and thus easy to cause the valve core 107 to be unable to rotate smoothly to the next valve core position. As shown in FIG. 3B, the sealing members 106, 406 are respectively spaced apart from the fluid connectors 108A, 108B, 108C by a gap S. When the closing wall 1073 of the valve core 107 is pushed by the fluid pressure to press against the sealing member 106C, the sealing member 106C deforms to seal the closing wall 1073. Since the sealing member 106C is spaced apart from the fluid connector 108C by the gap S and the sealing member 106C is connected to the housing 109 in a non-fixed manner (i.e., connected in a sealing manner by means of a sealing ring), under the action of the fluid pressure, the sealing member 106C moves towards the fluid connector 108C, and then the closing wall 1073 tightly abutting against the sealing member 106C also moves towards the fluid connector 108C. Due to the deformation of the sealing member 106C and the gap S between the sealing member 106C and the fluid connector 108C, the closing wall 1073 is easy to be driven by the fluid pressure to move too far towards the fluid connector 108C, thus easy to cause the closing wall 1073 to detach from the sealing members 106A, 106B adjacent thereto or come into contact with the edges of the sealing members 106A, 106B adjacent thereto. Due to the detaching or contacting with the edges, the adjacent sealing members 106A, 106B do not suffer pressing or suffer less pressing, thus the sealing members 106A, 106B would deform to stop the closing wall 1073 in the rotating path of the valve core 107, thus causing the valve core 107 to be unable to rotate smoothly.

The above problem that the valve core 107 cannot rotate smoothly is especially evident in the condition that the closing wall 1073 of the valve element 107 has small contact regions with the sealing members 106A, 106B adjacent thereto. The closing wall 1073 of the valve core 107 having small contact regions with the sealing members 106A, 106B adjacent thereto may occur in the following applications: the valve core 107 is used in the fluid passage 1081 having a smaller inner diameter, the opening 1072 of the valve core 107 is configured to be smaller than the inner diameter of the fluid passage 1081, and other suitable applications. In the present disclosure, the second direction Y in which the valve core 107 makes the linear motion is configured to form an angle Φ which is an acute angle, for example, 0 to 45 degrees, so that the above problem can be solved to enable the valve core 107 to rotate smoothly to the next valve core position.

FIG. 3C shows the closing wall 1073 of the valve core 107 having small contact regions with the sealing members 106A, 106B adjacent thereto. In this example, it can effectively ensure the valve core 107 to rotate smoothly. The structure shown in FIG. 3C is the same as the structure shown in FIG. 3B, and the difference lies in that, in FIG. 3C, the closing wall 1073 of the valve core 107 has small contact regions with the sealing members 106A, 106B adjacent thereto.

As shown in FIG. 3C, when the fluid flows into the valve core 107, under the action of the pressure generated by the flowing fluid, the valve core 107 moves towards both the fluid connectors 108B, 108C in the extending direction Y of the engagement portion 1071 thereof. The movement of the valve core 107 actuated by the fluid pressure is directed in two directions, that is, towards the fluid connectors 108B, 108C, such that when the closing wall 1073 of the valve core 107 has small contact regions with the sealing members 106A, 106B adjacent thereto, the closing wall 1073 of the valve core 107 can not only tightly abut against the sealing member 106C, but also tightly abut against the sealing members 106A, 106B adjacent thereto, that is, respectively tightly abut against the portions 106A1, 106B1 of the sealing members 106A, 106B (see the enlarged view shown in the dashed circle). The closing wall 1073 of the valve core 107 is in contact with the scaling members 106A, 106B, 106C, such that the valve core 107 can rotate smoothly to other valve core positions when needed. The closing wall 1073 of the valve core 107 moves towards both the fluid connectors 108B, 108C, such that the closing wall 1073 does not move too far towards the fluid connector 108C to cause easy detachment from the sealing members 106A, 106B adjacent thereto or contact with the edges of the sealing members 106A, 106B adjacent thereto and thus cause the valve core 107 to be unable to rotate smoothly to other valve core positions.

As shown in FIG. 3D, the valve core 107 rotates to the second valve core position to allow the valve device 100 to be in a second flow state. In the second valve core position, the two openings 1072 of the valve core 107 are respectively aligned with the fluid passages 1081A, 1081C, and the closing wall 1073 of the valve core 107 is aligned with the fluid passage 1081B. When the valve device 100 is in the second flow state, the fluid can flow in from the fluid passage 1081A, sequentially flow through the opening 1072 aligned with the fluid passage 1081A, the inside of the valve core 107, and the opening 1072 aligned with the fluid passage 1081C, and flow out from the fluid passage 1081C (as indicated by the arrows). The sealing member 106B tightly abuts against the closing wall 1073 to engage with the closing wall 1073 in a sealing manner, thereby preventing the fluid from flowing into the fluid passage 1081B.

In other examples, other suitable valve core positions and fluid flow states may be set according to different needs of users.

Figure 4A:
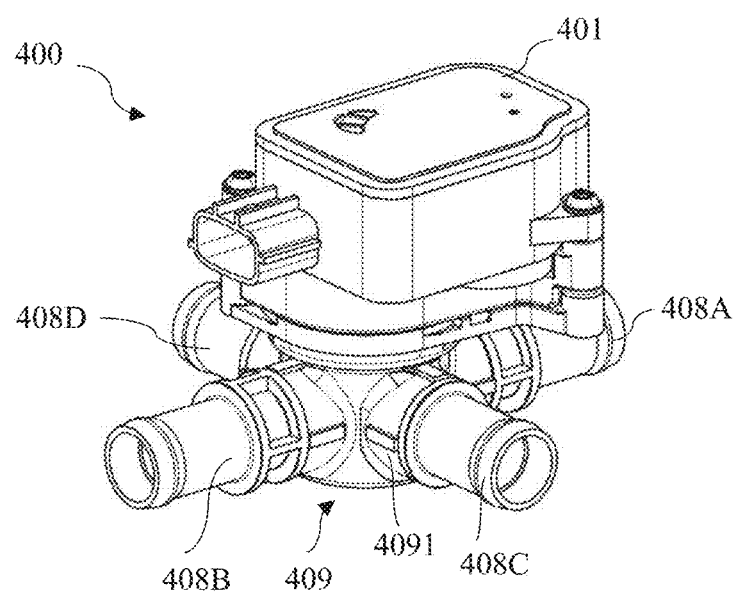
FIG. 4A is a perspective view of the valve device according to a second example of the present disclosure.
Figure 4B:
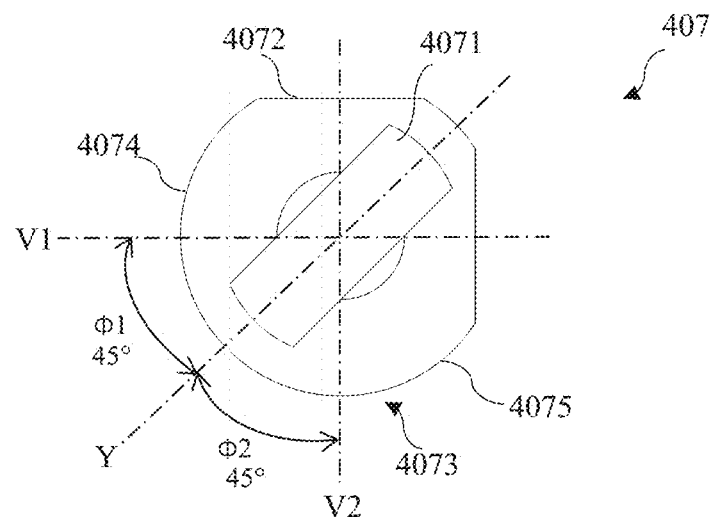
FIG. 4B is a top view of the valve core according to a first example shown in FIG. 4A.
Figure 4C:
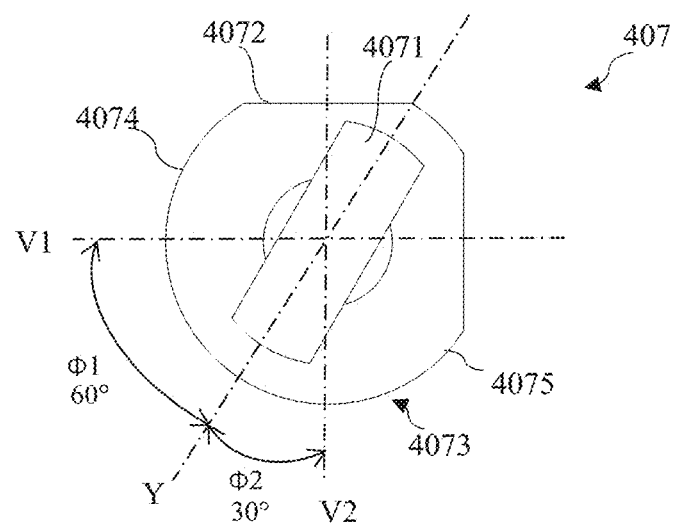
FIG. 4C is a top view of the valve core according to a second example shown in FIG. 4A.

FIG. 4A is a perspective view of a valve device 400 according to a second example of the present disclosure, FIG. 4B is a top view of a valve core 407 according to the first example shown in FIG. 4A, and FIG. 4C is a top view of the valve core 407 according to the second example shown in FIG. 4A.

As shown in FIG. 4A, the valve device 400 includes four fluid passages. The valve device 400 can be called a four-way valve device. The structure of the valve device 400 in FIG. 4A is similar to the structure of the valve device 100 shown in FIG. 1A, and the same structures will not be repeated herein. The valve device 400 includes a housing 409, which has four fluid connection portions 4091 and four fluid connectors 408A, 408B, 408C, 408D to define four fluid passages 4081A, 4081B, 4081C, 4081D. The fluid connectors 408A, 408B, 408C, 408D can be collectively called fluid connectors 408, and the fluid passages 4081A, 4081B, 4081C, 4081D can be collectively called fluid passages 4081. The fluid connectors 408A, 408B, 408C, 408D are arranged in a cross shape, and the adjacent fluid connectors are perpendicular to each other. The fluid connectors 408A, 408B, 408C, 408D are connected to the fluid connection portions 4091, respectively. The valve device 400 further includes scaling members 406A, 406B, 406C, 406D respectively disposed in the four fluid connection portions 4091 and aligned with the fluid connectors 408A, 408B, 408C, 408D, and the valve core 407 (see FIGS. 5B-5D). The scaling members 406A, 406B, 406C, 406D can be collectively called sealing members 406. The valve device 400 further includes a power source 401 which is configured to drive a driving member (not shown) to rotate and thus drive the valve core 407 to rotate to valve core positions. The valve core 407 is configured to be driven by the driving member to rotate the rotating axis in the first direction X, and to be driven by the fluid pressure to make a linear motion in the second direction Y. The second direction Y is perpendicular to the first direction X.

As shown in FIGS. 4B and 4C, the valve core 407 of the valve device 400 includes two openings 4072 and one closing wall 4073. The closing wall 4073 is a combined closing wall which is composed of a first closing wall 4074 and a second closing wall 4075, which are arranged symmetrically. In an example, the first closing wall 4074 and the second closing wall 4075 are formed integrally. The first closing wall 4074 is configured to align with one of the fluid passages to prevent the fluid from flowing through the fluid passage. The second closing wall 4075 is configured to align with one of the fluid passages to prevent the fluid from flowing through the fluid passage. An engagement portion 4071 is provided at the top of the valve core 407. The second direction Y along which the engagement portion 4071 of the valve core 407 extends forms a first angle $\Phi 1$ with an imaginary bisecting plane V1 of the first closing wall 4074, and forms a second angle $\Phi 2$ with an imaginary bisecting plane V2 of the second closing wall 4075. The first angle $\Phi 1$ and the second angle $\Phi 2$ are acute angles. The imaginary bisecting plane V1 of the first closing wall 4074 is parallel to the rotating axis in the first direction X and passes through a center of the first closing wall 4074 and a center of the valve core 407. The imaginary bisecting plane V2 of the second closing wall 4075 is parallel to the rotating axis in the first direction X and passes through a center of the second closing wall 4075 and a center of the valve core 407. In an example, the first closing wall 4074 and the second closing wall 4075 include an overlapping part such that when the first closing wall 4074 and the second closing wall 4075 respectively align with the fluid passages, the imaginary bisecting plane V1 of the first closing wall 4074 and the imaginary bisecting plane V2 of the second closing wall 4075 are parallel to the extending direction of the aligned fluid passages (or the parts of the fluid passages near the center of the housing), respectively.

In an example, the sum of the first angle $\Phi 1$ and the second angle $\Phi 2$ is 90 degrees. In an example, the first angle $\Phi 1$ is 0 to 45 degrees (including 45 degrees), and the second angle $\Phi 2$ is 45 to 90 degrees (including 45 degrees). In an example, the first angle $\Phi 1$ is 0 to 30 degrees (including 30 degrees), and the second angle $\Phi 2$ is 60 to 90 degrees (including 60 degrees). In an example, the first angle $\Phi 1$ is 0 to 60 degrees (including 60 degrees), and the second angle $\Phi 2$ is 30 to 90 degrees (including 30 degrees). In an example, the first angle $\Phi 1$ is 45 to 60 degrees, and the second angle $\Phi 2$ is 30 to 45 degrees. In another example, the first angle $\Phi 1$ is 30 to 45 degrees, and the second angle $\Phi 2$ is 45 to 60 degrees. As shown in FIG. 4B, the first angle $\Phi 1$ and the second angle $\Phi 2$ are both 45 degrees. As shown in FIG. 4C, the first angle $\Phi 1$ is 60 degrees, and the second angle $\Phi 2$ is 30 degrees.

Figure 5A:
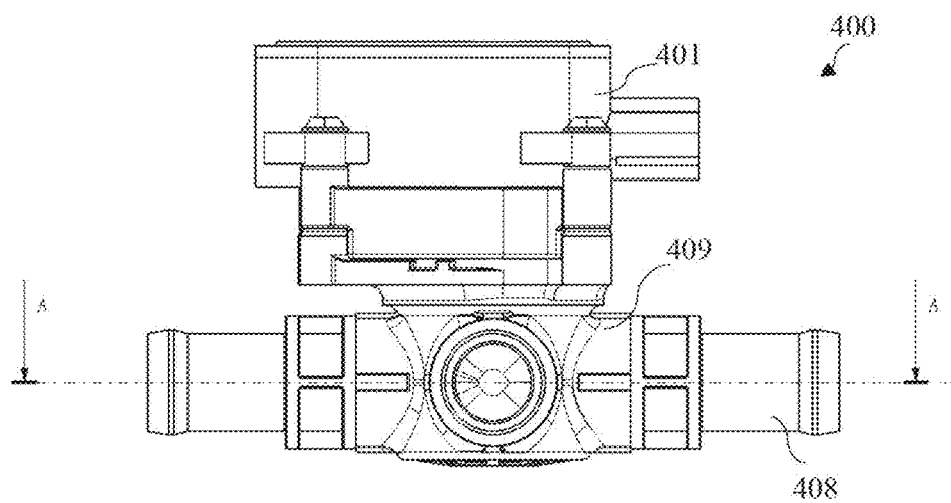
FIG. 5A is a rear view of the valve device shown in FIG. 4A.
Figure 5B:
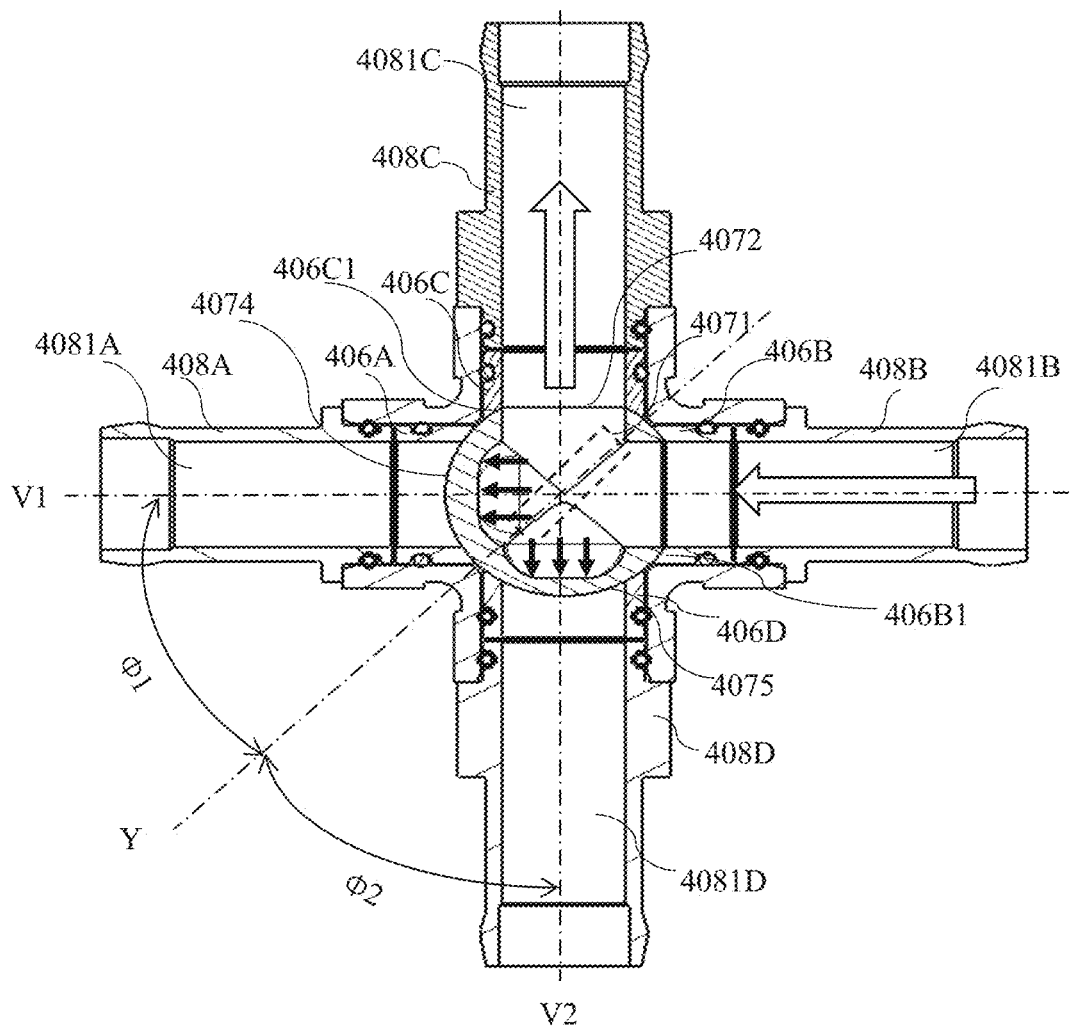
FIG. 5B is a cross-sectional view, taken along section line A-A, of the valve core of the valve device shown in FIG. 4A when in a first valve core position.
Figure 5C:
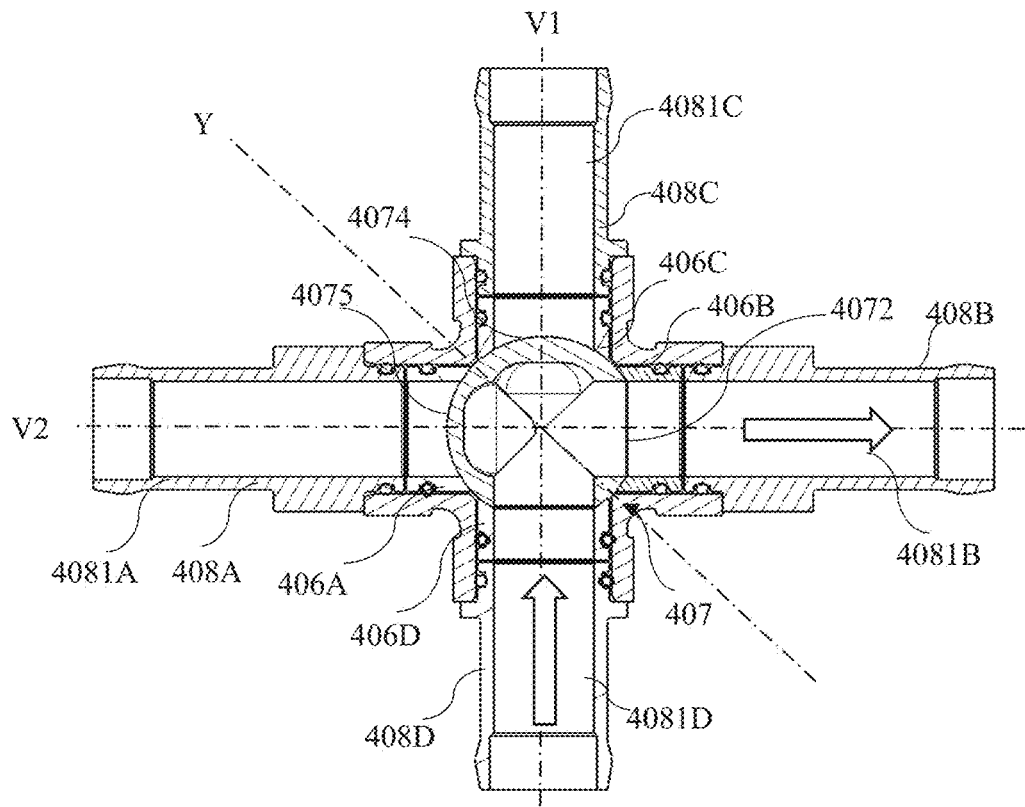
FIG. 5C is a cross-sectional view, taken along section line A-A, of the valve core of the valve device shown in FIG. 4A when in a second valve core position.
Figure 5D:
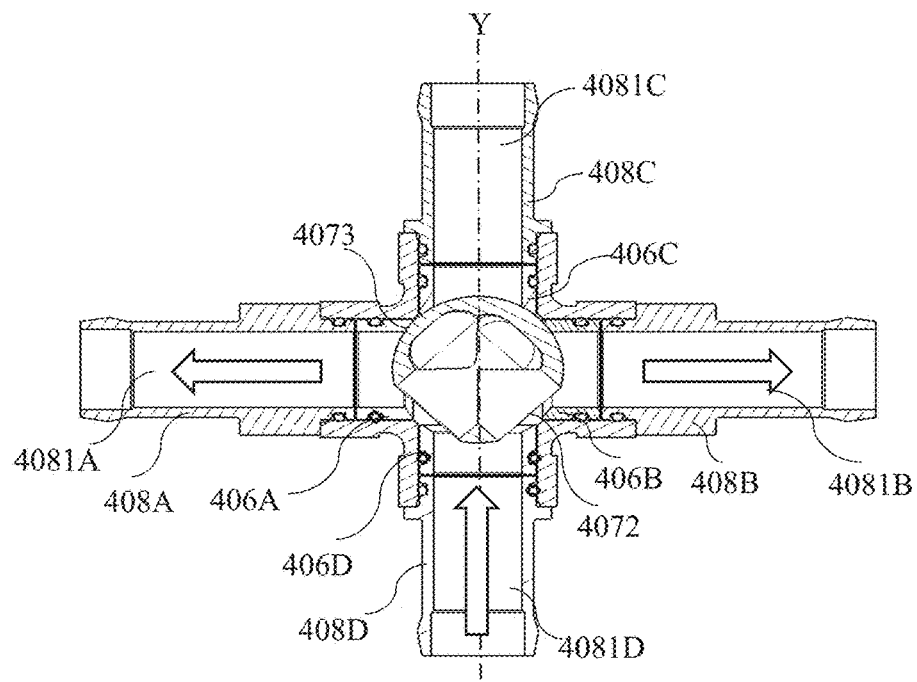
FIG. 5D is a cross-sectional view, taken along section line A-A, of the valve core of the valve device shown in FIG. 4A when in a third valve core position.

FIG. 5A is a rear view of the valve device 400 shown in FIG. 4A, FIG. 5B is a cross-sectional view, taken along section line A-A, of the valve core 407 of the valve device 400 shown in FIG. 4A when in a first valve core position, FIG. 5C is a cross-sectional view, taken along section line A-A, of the valve core 407 of the valve device 400 shown in FIG. 4A when in a second valve core position, and FIG. 5D is a cross-sectional view, taken along section line A-A, of the valve core 407 of the valve device 400 shown in FIG. 4A when in a third valve core position.

As shown in FIG. 5B, the fluid connectors 408A, 408B, 408C, 408D and the sealing members 406A, 406B, 406C, 406D internally form the four fluid passages 4081A, 4081B, 4081C, 4081D, respectively. The valve core 407 rotates to the first valve core position to allow the valve device 400 to be in a first flow state. In the first valve core position, the two openings 4072 of the valve core 407 respectively align with the fluid passages 4081B, 4081C, and the first closing wall 4074 and the second closing wall 4075 of the closing wall 4073 of the valve core 407 respectively align with the fluid passages 4081A, 4081D. When the valve device 400 is in the first flow state, the fluid can flow in from the fluid passage 4081B, sequentially flow through the opening 4072 aligned with the fluid passage 4081B, the inside of the valve core 407, and the opening 4072 aligned with the fluid passage 4081C, and flow out from the fluid passage 4081C (as indicated by the arrows). The sealing member 406A tightly abuts against the first closing wall 4074 to engage with the first closing wall 4074 in a sealing manner, thereby preventing the fluid from flowing into the fluid passage 4081A. The sealing member 406D tightly abuts against the second closing wall 4075 to engage with the second closing wall 4075 in a sealing manner, thereby preventing the fluid from flowing into the fluid passage 4081D.

As shown in FIG. 5B, the second direction Y along which the engagement portion 4071 (as shown in the dashed box) extends forms the angle Φ1 with the imaginary bisecting plane V1 of the first closing wall 4074, and forms the angle Φ2 with the imaginary bisecting plane V2 of the second closing wall 4075. Therefore, when the fluid flows into the valve core 407, under the action of the fluid pressure, the valve core 407 moves towards the fluid connectors 408A, 408D in the second direction Y, such that the first closing wall 4074 of the valve core 407 tightly abuts against the sealing member 406A while the second closing wall 4075 tightly abuts against the sealing member 406D, so as to prevent the fluid from flowing through the fluid connectors 408A, 408D. With this arrangement of the engagement portion 4071, the movement of the valve core 407 in the second direction Y can simultaneously prevent the fluid from flowing through the two fluid connectors 408A, 408D. In addition, this movement also causes the closing wall 4073 of the valve core 407 to not only tightly abut against the sealing members 406A, 406D, but also tightly abut against the sealing members 406C, 406B adjacent thereto, for example, tightly abut against the portions 406C1, 406B1 of the sealing members 406C, 406B, and thus the valve core 407 can rotate smoothly to other valve core positions when needed. According to the present disclosure, it can prevent the valve core 407 from moving too far when moving towards only one fluid connector (the fluid connector 408A or 408D) and thus causing the closing wall 4073 to detach from the sealing members 406C, 406B adjacent thereto and further causing the valve core 407 to be unable to rotate smoothly to the next valve core position.

As shown in FIG. 5C, the valve core 407 rotates to the second valve core position to allow the valve device 400 to be in a second flow state. In the second valve core position, the two openings 4072 of the valve core 407 respectively align with the fluid passages 4081B, 4081D, and the first closing wall 4074 and the second closing wall 4075 of the closing wall 4073 of the valve core 407 respectively align with the fluid passages 4081C, 4081A. When the valve device 400 is in the second flow state, the fluid can flow in from the fluid passage 4081D, sequentially flow through the opening 4072 aligned with the fluid passage 4081D, the inside of the valve core 407, and the opening 4072 aligned with the fluid passage 4081B, and flow out from the fluid passage 4081B (as indicated by the arrows). The sealing member 406C tightly abuts against the first closing wall 4074 to engage with the first closing wall 4074 in a sealing manner, thereby preventing the fluid from flowing into the fluid passage 4081C. The sealing member 406A tightly abuts against the second closing wall 4075 to engage with the second closing wall 4075 in a sealing manner, thereby preventing the fluid from flowing into fluid passage 4081A.

Under the action of the fluid pressure, the closing wall 4073 moves towards the fluid connectors 408A, 408C in the second direction Y to prevent the fluid from flowing through the fluid connectors 408A, 408C, and the closing wall 4073 comes into contact with the sealing members 406A, 406B, 406C, 406D to enable the valve core 407 to rotate smoothly to other valve core positions.

As shown in FIG. 5D, the valve core 407 rotates to the third valve core position to allow the valve device 400 to be in a third flow state. In the third valve core position, one opening 4072 of the valve core 407 is partially aligned with the fluid passages 4081A, 4081D, the other opening 4072 of the valve core 407 is partially aligned with the fluid passages 4081B, 4081D, and the closing wall 4073 of the valve core 407 is aligned with the fluid passage 4081C and partially aligned with the fluid passages 4081A, 4081B. When the valve device 400 is in the second flow state, the fluid can flow in from the fluid passage 4081D, sequentially flow through the opening 4072 aligned with the fluid passage 4081D, the inside of the valve core 407, and the opening 4072 aligned with the fluid passage 4081A, and flow out from the fluid passage 4081A (as indicated by the arrows); and the fluid can also flow in from the fluid passage 4081D, sequentially flow through the opening 4072 aligned with the fluid passage 4081D, the inside of the valve core 407, and the opening 4072 aligned with the fluid passage 4081B, and flow out from the fluid passage 4081B (as indicated by the arrows). The sealing member 406C tightly abuts against the closing wall 4073 to engage with the closing wall 4073 in a sealing manner, thereby preventing the fluid from flowing into the fluid passage 4081C. In other examples, other suitable valve core positions and fluid flow states may be set according to different needs of users.

Under the action of the fluid pressure, the closing wall 4073 moves towards the fluid connector 408C in the second direction Y to prevent the fluid from flowing through the fluid connector 408C, and the closing wall 4073 tightly abuts against the sealing members 406A, 406B, 406C to enable the valve core 407 to rotate smoothly to other valve core positions.

It should be noted that the valve device of the present disclosure is also applicable to valve devices having passages of various types, for example, a two-way valve device, a five-way valve device, etc.

Although the present disclosure is described with reference to the examples of examples outlined above, various alternatives, modifications, variations, improvements and/or substantial equivalents, which are known or anticipated at present or to be anticipated before long, may be obvious to those of at least ordinary skill in the art. In addition, the technical effects and/or technical problems described in this specification are exemplary rather than limiting; therefore, the disclosure in this specification may be used to solve other technical problems and have other technical effects and/or may solve other technical problems. Accordingly, the examples of the examples of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A valve device, characterized by the valve device comprising:
   a housing internally provided with at least two fluid passages and sealing members located at a port of each fluid passage; and
   a valve core disposed in the housing, the valve core comprising at least one closing wall, and the valve core being configured to be capable of rotating around an axis in a first direction in the housing to enable the closing wall to align with the corresponding fluid passage to close the aligned fluid passage,
   wherein the valve core is configured to be capable of making a linear motion in a second direction in the housing to allow the closing wall to tightly abut against the sealing member at the closed fluid passage, wherein the second direction forms an angle with an imaginary bisecting plane of the closing wall of the valve core, the angle is greater than zero degrees and less than 90 degrees.

2. The valve device of claim 1, wherein
   the valve core further comprises an engagement portion configured to be capable of engaging with a driving member, to allow the valve core to be driven by the driving member to rotate around the axis in the first direction, and to allow the valve core to be driven by a fluid pressure to make the linear motion in the second direction relative to the driving member.

3. The valve device of claim 2, wherein
   the engagement portion of the valve core comprises one of a guide groove and a protrusion, the guide groove and the protrusion extend in the second direction.

4. The valve device of claim 3, wherein
   the valve device further comprises the driving member comprising a driving portion, the driving portion is shaped to match the engagement portion of the valve core so as to enable the valve core to engage with the driving member.

5. The valve device of claim 4, wherein
   the driving portion of the driving member comprises the other one of the guide groove and the protrusion, the guide groove is configured to receive the protrusion,
   wherein the guide groove is adapted to the protrusion in a widthwise direction, so as to enable the protrusion to drive the guide groove to rotate around the axis in the first direction, or enable the guide groove to drive the protrusion to rotate around the axis in the first direction, and
   wherein a length of the guide groove in a lengthwise direction is greater than a length of the protrusion, such that the protrusion does not prevent the guide groove from being driven by the fluid pressure to make the linear motion in the second direction, or such that the guide groove does not prevent the protrusion from being driven by the fluid pressure to make a linear motion in the second direction.

6. The valve device of claim 1, wherein
   the valve device comprises a four-way valve device comprising four fluid passages, wherein the valve core of the four-way valve device comprises two adjacently arranged closing walls.

7. The valve device of claim 1, wherein
   the imaginary bisecting plane is parallel to the axis of the valve core and passes through a center of the closing wall and a center of the valve core,
   the valve core is hollow and comprises at least one opening, the valve core is configured to be rotate around the axis in the first direction in the housing to enable the opening to align with the corresponding fluid passage to open the aligned fluid passage,
   the second direction is perpendicular to the first direction.

8. The valve device of claim 1, wherein
   the housing comprises at least two fluid connection portions and is provided with at least two fluid connectors in fluid communication with the at least two fluid connection portions, the at least two fluid connection portions and the at least two fluid connectors define the at least two fluid passages, wherein the sealing member provided in each of the fluid connection portions is spaced apart from the corresponding fluid connector by a gap.

9. A valve device, characterized by the valve device comprising:
   a housing internally provided with at least two fluid passages and sealing members located at a port of each fluid passage; and
   a valve core disposed in the housing, the valve core comprising at least one closing wall, and the valve core being configured to be capable of rotating around an axis in a first direction in the housing to enable the closing wall to align with the corresponding fluid passage to close the aligned fluid passage,
   wherein the valve core is configured to be capable of making a linear motion in a second direction in the housing to allow the closing wall to tightly abut against the sealing member at the closed fluid passage, wherein the second direction forms an angle with an imaginary bisecting plane of the closing wall of the valve core, the angle is 30 to 45 degrees.

10. The valve device of claim 9, wherein
    the valve core further comprises an engagement portion configured to be capable of engaging with a driving member, to allow the valve core to be driven by the driving member to rotate around the axis in the first direction, and to allow the valve core to be driven by a fluid pressure to make the linear motion in the second direction relative to the driving member.

11. The valve device of claim 10, wherein
    the engagement portion of the valve core comprises one of a guide groove and a protrusion, the guide groove and the protrusion extend in the second direction.

12. The valve device of claim 11, wherein
    the valve device further comprises the driving member comprising a driving portion, the driving portion is shaped to match the engagement portion of the valve core so as to enable the valve core to engage with the driving member.

13. The valve device of claim 12, wherein
    the driving portion of the driving member comprises the other one of the guide groove and the protrusion, the guide groove is configured to receive the protrusion,
    wherein the guide groove is adapted to the protrusion in a widthwise direction, so as to enable the protrusion to drive the guide groove to rotate around the axis in the first direction, or enable the guide groove to drive the protrusion to rotate around the axis in the first direction, and
    wherein a length of the guide groove in a lengthwise direction is greater than a length of the protrusion, such that the protrusion does not prevent the guide groove from being driven by the fluid pressure to make the linear motion in the second direction, or such that the guide groove does not prevent the protrusion from being driven by the fluid pressure to make a linear motion in the second direction.

14. A valve device, characterized by the valve device comprising:
a housing internally provided with at least two fluid passages and sealing members located at a port of each fluid passage; and
a valve core disposed in the housing, the valve core comprising at least one closing wall, and the valve core being configured to be capable of rotating around an axis in a first direction in the housing to enable the closing wall to align with the corresponding fluid passage to close the aligned fluid passage,
wherein the valve core is configured to be capable of making a linear motion in a second direction in the housing to allow the closing wall to tightly abut against the sealing member at the closed fluid passage, wherein the second direction forms an angle with an imaginary bisecting plane of the closing wall of the valve core, the angle is 45 to 60 degrees.

15. The valve device of claim 14, wherein
the valve core further comprises an engagement portion configured to be capable of engaging with a driving member, to allow the valve core to be driven by the driving member to rotate around the axis in the first direction, and to allow the valve core to be driven by a fluid pressure to make the linear motion in the second direction relative to the driving member.

16. The valve device of claim 15, wherein
the engagement portion of the valve core comprises one of a guide groove and a protrusion, the guide groove and the protrusion extend in the second direction.

17. The valve device of claim 16, wherein
the valve device further comprises the driving member comprising a driving portion, the driving portion is shaped to match the engagement portion of the valve core so as to enable the valve core to engage with the driving member.

18. The valve device of claim 17, wherein
the driving portion of the driving member comprises the other one of the guide groove and the protrusion, the guide groove is configured to receive the protrusion,
wherein the guide groove is adapted to the protrusion in a widthwise direction, so as to enable the protrusion to drive the guide groove to rotate around the axis in the first direction, or enable the guide groove to drive the protrusion to rotate around the axis in the first direction, and
wherein a length of the guide groove in a lengthwise direction is greater than a length of the protrusion, such that the protrusion does not prevent the guide groove from being driven by the fluid pressure to make the linear motion in the second direction, or such that the guide groove does not prevent the protrusion from being driven by the fluid pressure to make a linear motion in the second direction.

* * * * *